June 24, 1969     D. W. DAVIES ET AL     3,451,274

ELECTROSTATICALLY SUPPORTED INERTIAL DEVICE

Filed Aug. 27, 1962

INVENTORS
DUANE W. DAVIES
DALE R. INGWERSON
BY

ATTORNEY

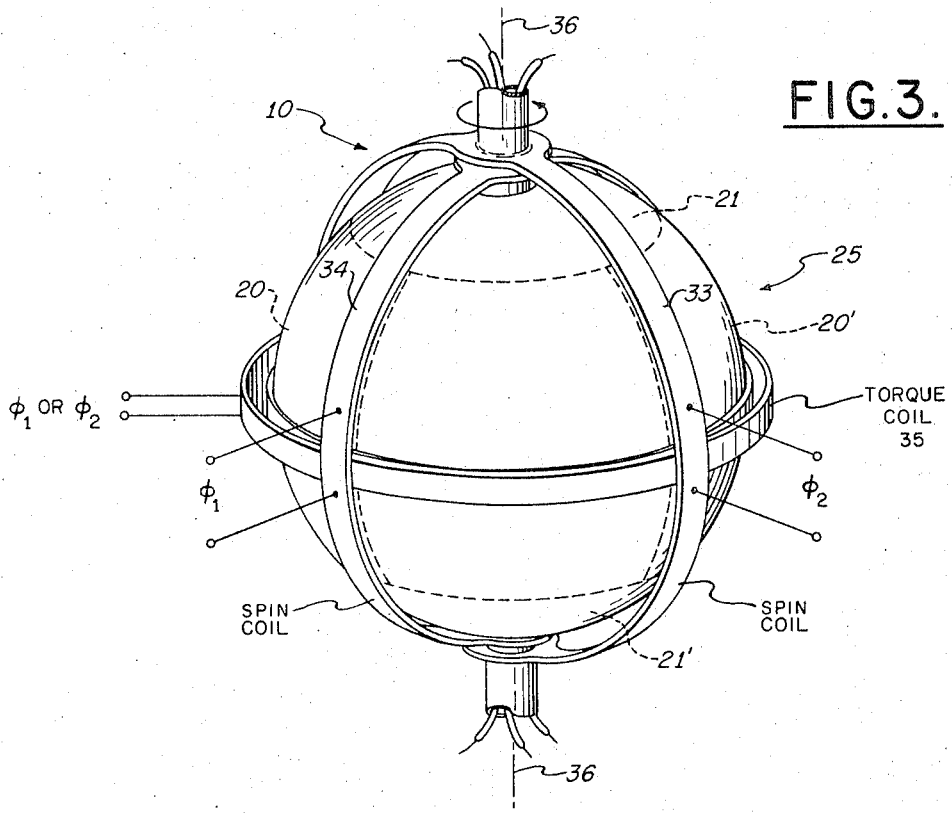
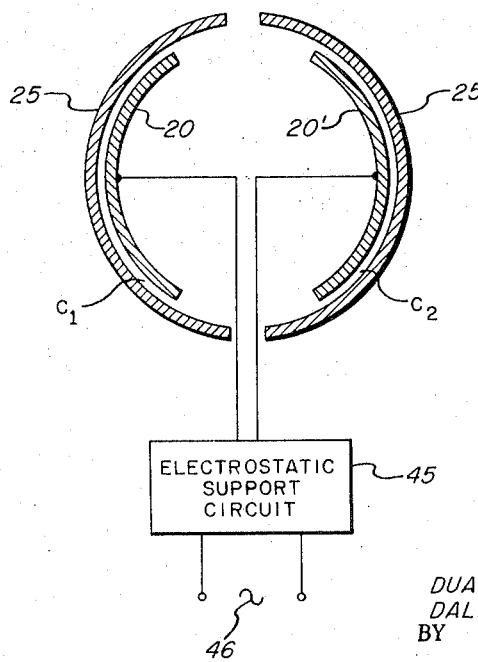

United States Patent Office 3,451,274
Patented June 24, 1969

3,451,274
ELECTROSTATICALLY SUPPORTED
INERTIAL DEVICE
Duane W. Davies Sunnyvale, and Dale R. Ingwerson, Santa Clara, Calif., assignors to Sperry Rand Corporation, Great Neck, N.Y., a corporation of Delaware
Filed Aug. 27, 1962, Ser. No. 219,654
Int. Cl. G01c 19/02
U.S. Cl. 74—5
9 Claims The present invention relates to an electrostatically supported inertial device and particularly to a three dimensional inertial device supported in a manner which eliminates friction between the support structure and the sensitive element.

The problem inherent in prior art inertial devices of the type used for navigation, such as accelerometers and gyroscopes, is that they are subject to errors due to friction between the support means and the sensitive element. The sensitive element therefore provides a signal that is not only a function of the desired motion to be measured but also includes an undesirable error component resulting primarily from friction. The present invention eliminates the errors due to friction by electrostatically supporting the sensitive element.

Prior attempts at electrostatically supporting a sensitive element required maintaining extremely close machining tolerances with respect to the rotating element and the stationary element. The present invention appreciably reduces this requirement by having a hollow rotor surround a stator element having an external shape that substantially conforms to the internal shape of the rotor. In this manner, the cooperative parts can be more readily matched and balanced than previously.

The prior art devices have a rotor element mounted within a stator element thereby rendering it difficult to sense accurately the movements of the rotor relative to the stator. This arrangement also renders it difficult to balance the rotor since the material therefrom must be relocated while its external sphericity must be precisely maintained. The present invention overcomes these disadvantages by having the rotor mounted externally of the stator thereby permitting relative movement of the rotor to be measured precisely and easily. Further the critical dimension of the rotor of the present invention is the internal surface which cooperates with the external surface of the stator. Thus the rotor may be balanced by relocating material from the external surface of the rotor without disturbing the cooperative surfaces of the rotor and stator elements.

Additional advantages of the present invention include more accurate alignment of the gimbal axis and rotor axis to a greater degree than previously and the ability to torque the rotary directly and quickly.

It is a principal object of the invention to provide an electrostatically supported inertial device which provides precise information undistorted by errors due to friction.

It is an additional object of the present invention to provide an electrostatically supported inertial device in which the movement of the sensitive element is readily measured and the sensitive element is accessible for positioning.

It is another object of the present invention to provide an electrostatically supported inertial device which is relatively economical to manufacture because of simpler machining operations.

The above objects are accomplished by the present invention which has a stator member having a plurality of pairs of condenser plates which define the external shape of the stator and a hollow sensitive inertial element having an internal surface of conductive material forming a condenser plate that cooperates with and surrounds the pairs of condenser plates of the stator member. The element is electrostatically suspended with respect to the stator by applying a potential to the stator plates.

Referring to the drawings,

FIG. 3 is a front view of the gyroscope of FIG. 1 showing the arrangement of the spin and torque coils; and FIG. 4 is a schematic diagram showing a typical circuit for electrostatically supporting the gyroscope of FIG. 1.

For purposes of example the present invention will be described as applied to a gyroscope, it being appreciated that it is also applicable to other inertial devices.

Figure 1:
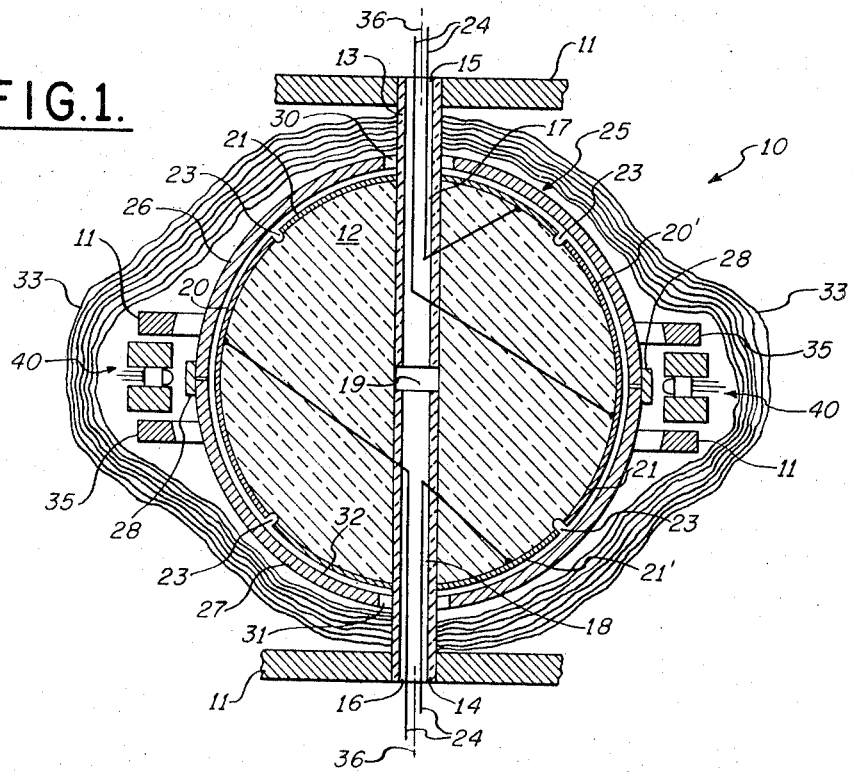
FIG. 1 is a sectional schematic view of a gyroscope constructed in accordance with the present invention in which the stator has six plates.

Referring to FIG. 1 a gyroscope 10 is shown enclosed in a housing 11. The interior of the housing 11 is evacuated to eliminate the gaseous friction of the atmosphere and also to prevent arcing. The gyroscope 10 includes a spherical stator 12 which is supported on the housing 11 by two hollow ceramic rods 13 and 14. The rods 13 and 14 extend within the stator 12 and cooperate with openings 15 and 16 respectively in the housing 11 to form conduits 17 and 18.

The stator 12 consists of a dielectric material such as a ceramic and has mounted on its spherical surface a plurality of pairs of condenser plates. The embodiment of FIG. 1 has six condenser plates only four of which 20, 20', 21 and 21' are shown. The semi-spherical condenser plates substantially define the external spherical surface 22 of the stator 12. Each plate 20 of a pair of plates 20, 20', for example, has an area equal to that to the other plate 20' of that pair 20, 20' and they are disposed in diametrically opposed symmetrical relationship with respect to each other. Thus, for example, plate 20 is diametrically opposite plate 20' and they are symmetrical in that they are displaced the same distance from the center 19 of the stator 12 and have the same shape including area.

Figure 2:
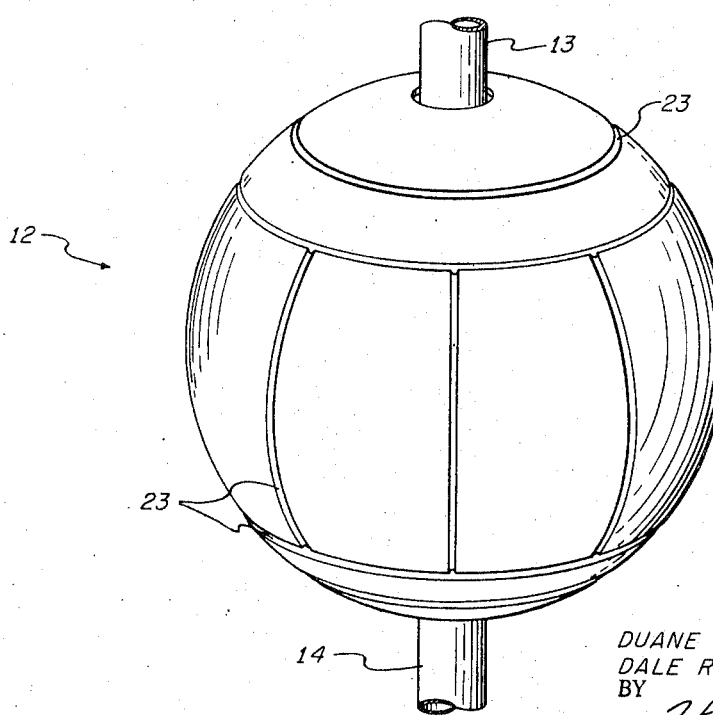
FIG. 2 is a front view of a stator having twelve plates.

The condenser plates 20, 20', 21, 21' are preferably formed by electroplating the surface of the stator 12 to provide a conductive coating thereon and then dividing the stator surface 22 into six plates of equal area by cutting grooves 23 in the plating as shown more clearly in FIG. 2 with respect to a twelve plate arrangement. The grooves 23 are extended into the ceramic of the stator 12 to reduce the field strength from plate to plate on the surface of the ceramic insulating gap.

Electrical connections from an alternating current source (not shown) to each of the plates 20, 20', 21, 21' are made by running wires 24 through the conduits 17 and 18 in the support rods 13 and 14 respectively and attaching the wires 24 to the respective plates. The shafts 13 and 14 as well as the stator 12 must be made of a material which has a high dielectric strength in order to insulate the high voltages involved and the material should also be machinable. The wires 24 are preferably separated from each other within the conduits 17 and 18 by conventional means not shown.

The rotor or sensitive element 25 of the gyroscope 10 consists of hollow metallic spherical shell constructed preferably in two hemispherical halves 26 and 27 that are held together by a flat ring 28. The rotor 25 encloses the stator 12 except for holes 30 and 31 in the rotor halves 26 and 27 which permit the support shafts 13 and 14 respectively to extend therethrough. The internal surface 32 of the rotor 25 is cooperative with the external surface of the stator 12 as defined by the condenser plates 20, 20', 21, 21'. The internal surface 32 acts as a condenser plate to form in conjunction with the plates 20, 20', 21, 21' a plurality of condensers which are adapted to electrostatically support the rotor 25 when a suitable potential is applied in a manner to be more fully described.

The six condenser plates on the stator 12 define three mutually perpendicular axes. Two plates 21, 32 at a pole act in conjunction to coerce the rotor 25 toward that pole while the two plates 21', 32 at the opposite pole exert a force on the rotor 25 in the opposite direction. Similarly two plates 20, 32 on one side of the stator 12 cooperate with the two plates 20', 32 on the opposite side to produce opposing forces on the rotor 25 in opposite directions along an axis defined by the centers of the plates 20, 20' thereby balancing the forces tending to support the rotor 25.

As shown more clearly in FIG. 3, three mutually perpendicular induction coils 33, 34 and 35 are mounted on the housing 11 to encircle the rotor 25. The planes of the coils 33 and 34 pass through the polar axis of the gyroscope 10 and are perpendicular to each other while the plane of the third coil 35 is coincident with the equatorial plane of the gyroscope 10 and therefore perpendicular to the other two coils 33 and 34. The coils 33 and 34 are spin coils while the coil 35 is a torque coil. The spin coils 33 and 34 are energized by different phases of a two phase A.C. voltage supply while the torque coil 35 is energized by a voltage of the same frequency for initial alignment of the rotor 25 with the spin axis 36. The torque movements of the rotor 25 are detected by means of a pick-off 40 which cooperates with the flat ring 28. The pick-off 40 may for example be an optical photoelectric or a capacitive type pick-off mounted on the housing 11.

Coil 35 is adapted to torque the rotor 25 in order that it maintains a predetermined position with its spin axis aligned with the axis 36.

Referring to FIG. 4, the rotor 25 is shown electrostatically supported about one axis by fixed plates 20, 20' by means of a suitable electrostatic support circuit 45 that is connected to an alternating current source 46. The circuit 45 may, for example, be of the type disclosed in the U.S. Patent No. 3,003,356 entitled Free-Gyro Systems for Navigation or the Like, issued Oct. 10, 1961 to A. T. Nordsieck or of the type disclosed in U.S. application Ser. No. 122,708, now Patent No. 3,221,563, entitled Suspension Apparatus of W. G. Wing, filed July 10, 1961. The plate 20 and the rotor 25 form one capacitor having a capacitance $C_1$ while the plate 20' and the rotor 25 form another capacitor having a capacitance $C_2$. The other pairs of supporting plates have similar circuitry connected thereto to provide electrostatic suspension about all three mutually perpendicular axes.

In operation, with the rotor 25 supported in the electrostatic fields, each of the two spin coils 33 and 34 is energized by different phases of the two phase A.C. supply. To bring the rotor 25 up to its operating speed in order that it may experience gyroscopic properties, the coils 33 and 34 produce a rotating magnetic field which produces eddy currents in the rotor 25 that cause it to rotate with the field in the manner of a drag-cup induction motor. Since the rotor 25 is supported in a vacuum and the electrostatic support is frictionless there is little to restrain the rotation and it reaches synchronous speed. Once the rotor 25 is spinning there is little to slow it down except occasional molecules in the vacuum and the spin coils 33 and 34 are de-energized. The rotor 25 will continue to spin for days with very little loss of speed.

When the rotor 25 is initially brought up to speed, its spin axis is not normally precisely aligned with the desired orientation, i.e. the axis 36. This is accomplished by exciting the torque coil 35 with the first phase, for example, of the supply voltage while the spin coils 33 and 34 are energized in order that the resulting field will interact with the spin coil which is excited with the second phase to produce a field which rotates in the plane of the first spin coil. This causes the rotor 25 to be torqued about an axis passing through the intersection of these two coils. The spin axis of the rotor 25 is thus precessed toward this axis. Similarly, excitation of the torquing coil 35 by the second phase causes a precession toward an axis 90° away. Thus the spin axis can be made to move in any direction by applying the appropriate phase to the torquing coil 35. The rotor 25 is made somewhat heavier at the equator than at the poles by the ring 28 to give it a preferred spin axis. The spin axis of the rotor 25 tends to maintain a fixed direction in inertial space thereby functioning as a gyroscope.

It will be appreciated that a six plate embodiment has been shown for purpose of example and that other configurations such as the twelve plate arrangement shown in FIG. 2 are also within the scope of this invention, the only requirements having been defined above in the specification. Further other methods of electrostatically supporting, spinning, torquing and sensing motion of the rotor 25 may be utilized; the structure shown being described for purposes of example only.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. An electrostatically supportetd inertial device, comprising
   (a) a stator member having a plurality of pairs of condenser plates substantially defining the external shape of said member,
   (b) each plate of a pair thereof being of equal area with respect to the other plate of said pair and disposed in opposed symmetrical relationship therewith,
   (c) a sensitive inertial element having an internal surface of conductive material forming a condenser plate cooperative with and surrounding said stator member,
   (d) said element being adapted for suspension with respect to said stator in accordance with the potential applied to said plates,
   (e) and means for applying a potential to said plates for electrostatically suspending said element with respect to said stator.

2. An electrostatically supported inertial device, comprising
   (a) a stator member having a plurality of pairs of condenser plates mounted thereon substantially defining the external shape of said member,
   (b) each plate of said pair thereof being of equal area with respect to the other plate of said pair and disposed in opposed symmerical relationship therewith,
   (c) a positionable sensitive inertial element having an internal surface cooperative with and surrounding said stator member,
   (d) said internal surface forming a condenser plate cooperative with said pairs of condenser plates,
   (e) said element being adapted for suspension with respect to said stator by means of forces tending to centralize said element in accordance with the potential applied to said plates,
   (f) and means for applying a potential to said plates for electrostatically suspending said element with respect to said stator.

3. An electrostatically supported sensitive element comprising
   (a) a substantially spherical stator element having a plurality of pairs of condenser plates defining at least a portion of the external shape of said member,
   (b) each plate of a pair thereof being of equal area with respect to the other plate of said pair and disposed in opposed symmetrical relation therewith,
   (c) a hollow inertial element having an internal surface of conductive material forming a condenser plate cooperative with and surrounding said pairs of plates, (d) the internal diameter of said spherical element being slightly greater than the external diameter defined by said pairs of plates, (e) said element being adapted for rotatable suspension with respect to said stator in accordance with the potential applied to said plates, (f) and means for applying a potential to said plates for electrostatically suspending said element with respect to said stator.

4. An element of the character described in claim 3 including a pair of mutually perpendicular induction coils encircling said spherical elements for rotating said element.

5. An electrostatically supported gyroscope comprising
(a) a substantially spherical stator,
(b) a plurality of pairs of semi-spherical condenser plates mounted on said stator and substantially defining the spherical surfaces thereof,
(c) each plate of a pair thereof being of equal area with respect to the other plate of said pair and disposed in opposed symmetrical relation therewith,
(d) a hollow spherical gyroscopic rotor surrounding said stator having an internal surface of conductive material forming a condenser plate cooperative with said pairs of condenser plates,
(e) said rotor and said pairs of plates being cooperative to form a plurality of capacitors for electrostatically suspending said rotor with respect to said stator in accordance with the potential applied to said plates,
(f) and means for applying a potential to said plates for electrostatically suspending said element with respect to said stator.

6. An electrostatically supported gyroscope comprising
(a) a substantially spherical stator,
(b) a plurality of conductive semi-spherical plates mounted on said stator and defining the spherical surface thereof,
(c) means connected to each of said plates on the interior side thereof and extending exteriorly of said sphere for providing a potential to each of said plates,
(d) and a rotor comprising a hollow metallic spherical shell surrounding said spherical stator,
(e) said rotor and said semi-spherical plates cooperatively forming a plurality of capacitors whereby said rotor is electrostatically supported.

7. A gyroscope of the character described in claim 6, including a plurality of mutually perpendicular induction coils encircling said rotor for rotating said rotor.

8. A gyroscope of the character described in claim 7, including an additional induction coil encircling said rotor for torquing the spin axis of said rotor to have a predetermined orientation.

9. Apparatus for supporting a conductive element by electrostatic forces comprising
(a) a stator member having a plurality of pairs of condenser plates substantially defining the external shape of said member,
(b) each plate being insulated from the other plates,
(c) each plate of a pair thereof being of equal area with respect to the other plate of said pair and disposed in diametrically opposed symmetrical relationship therewith,
(d) a positionable sensitive inertial element having an internal surface of conductive material forming a condenser plate cooperative with and surrounding at least major portion of said stator member,
(e) means for applying a potential to said plates for electrostatically suspending said element with respect to said stator whereby said element is urged to a centralized position,
(f) and means for sensing the relative movement of said element with respect to said stator.

References Cited

UNITED STATES PATENTS 3,003,356  10/1961  Nordsieck _____ 74—5
3,098,679  7/1963   De Boice _____ 74—5 X FRED C. MATTERN, JR., *Primary Examiner.*

MANUEL ANTONAKAS, *Assistant Examiner.*

U.S. Cl. X.R.

74—5.7